(12) United States Patent
Bandukwala (10) Patent No.: US 10,613,759 B2
(45) Date of Patent: Apr. 7, 2020

(54) CLOUD-BASED DEVELOPMENT ENVIRONMENT WITH DEDUPLICATION ENGINE IMPROVING STORAGE EFFICIENCY

(71) Applicant: Coder Technologies, Inc., Austin, TX (US)

(72) Inventor: Ammar Hussain Bandukwala, Austin, TX (US)

(73) Assignee: CODER TECHNOLOGIES, INC., Austin, TX (US)

( * ) Notice: Subject to any disclaimer, the term of this patent is extended or adjusted under 35 U.S.C. 154(b) by 0 days.

(21) Appl. No.: 16/167,198

(22) Filed: Oct. 22, 2018

(65) Prior Publication Data

US 2019/0129624 A1 May 2, 2019

Related U.S. Application Data

(60) Provisional application No. 62/579,009, filed on Oct. 30, 2017.

(51) Int. Cl.
*G06F 3/06* (2006.01)
*G06F 16/13* (2019.01)
*G06F 16/174* (2019.01)
*G06F 16/215* (2019.01)

(52) U.S. Cl.
CPC .......... *G06F 3/0608* (2013.01); *G06F 3/0604* (2013.01); *G06F 3/067* (2013.01); *G06F 3/0629* (2013.01); *G06F 3/0641* (2013.01); *G06F 16/137* (2019.01); *G06F 16/1748* (2019.01); *G06F 16/215* (2019.01)

(58) Field of Classification Search
CPC .... G06F 3/0608; G06F 16/215; G06F 16/137; G06F 16/1748; G06F 3/0604; G06F 3/0629; G06F 3/0641; G06F 3/067
See application file for complete search history.

(56) References Cited

U.S. PATENT DOCUMENTS 7,624,106 B1 * 11/2009 Manley .................. G06F 16/16
707/786
7,831,789 B1 * 11/2010 Per ....................... G06F 11/1451
707/625

(Continued)

FOREIGN PATENT DOCUMENTS

WO   WO-2017180144 A1   10/2017
WO   WO-2019089263 A1   5/2019

OTHER PUBLICATIONS

PCT/US2018/056905 International Search Report and Written Opinion dated Apr. 5, 2019.

*Primary Examiner* — Alford W Kindred
*Assistant Examiner* — Lin Lin M Htay
(74) *Attorney, Agent, or Firm* — Wilson Sonsini Goodrich & Rosati (57) ABSTRACT

Described are computer-implemented methods and computing systems for automatically deduplicating a target dataset relative to a baseline dataset by providing distributed analysis of a first dataset to automatically generate a baseline dataset of the most common blocks of the first dataset, wherein the analysis is conducted in a distributed computing environment comprising a master computer system connected via a computer network to a plurality of computer systems.

20 Claims, 5 Drawing Sheets

(56) References Cited

U.S. PATENT DOCUMENTS

| | | | |
|---|---|---|---|
| 8,176,018 B1* | 5/2012 | Bisson | G06F 16/1734 |
| | | | 707/690 |
| 8,402,250 B1 | 3/2013 | Juillard | |
| 8,862,555 B1* | 10/2014 | Xu | G06F 16/1756 |
| | | | 707/687 |
| 9,679,040 B1* | 6/2017 | Davis | G06F 11/3006 |
| 2008/0133561 A1* | 6/2008 | Dubnicki | G06F 11/1453 |
| 2012/0166448 A1 | 6/2012 | Li et al. | |
| 2012/0191672 A1 | 7/2012 | Jayaraman | |
| 2016/0012098 A1 | 1/2016 | Li et al. | |
| 2017/0177266 A1 | 6/2017 | Doerner et al. | |

\* cited by examiner

| Data Similarity | Deduplication Savings |
|---|---|
| 100% | 99% |
| 90% | 89% |
| 80% | 79% |
| 70% | 69% |
| 60% | 59% |
| 50% | 49% |
| 40% | 39% |
| 30% | 29% |
| 20% | 19% |
| 10% | 9% |
| 0% | -1 % |

Fig. 4B

Fig. 5

US 10,613,759 B2

CLOUD-BASED DEVELOPMENT ENVIRONMENT WITH DEDUPLICATION ENGINE IMPROVING STORAGE EFFICIENCY

CROSS-REFERENCE TO RELATED APPLICATIONS

This application claims the benefit of U.S. Provisional Application No. 62/579,009, filed Oct. 30, 2017, which is hereby incorporated by reference in its entirety.

BACKGROUND OF THE INVENTION

A wide variety of computer technologies utilize cloud-based systems in which different computers within a system operate on respective datasets that include redundant information. Such systems often leverage remote data storage to offload various aspects of data management and data processing.

SUMMARY OF THE INVENTION

Existing distributed computer systems suffer from several technological problems related to redundant information being stored by multiple computer systems. Remote storage of redundant information can result in multiple users storing large amounts of data, particularly when users are working with significantly overlapping datasets. In addition to the financial costs associated with extra data storage and transmission, such redundancies can negatively impact computer performance. For example, the process of reconstituting or downloading a data object can be slowed significantly. Downloading large datasets also taxes network resources as well as local and remote computer processing resources, which can impact performance for all system users. Existing computer systems similarly suffer from excessive utilization of computer resources for data uploads, such as uploads that might occur when saving data to cloud-storage system. Existing deduplication technologies also suffer from suboptimal efficiency and accuracy.

The present invention solves these technical problems with existing computer systems by providing improved systems and techniques for providing and supporting the automatic deduplication of arbitrarily large datasets. These include, for example, improved systems and techniques for automatically identifying the most common blocks of data in a large dataset to generate a baseline for deduplication, for automatically identifying duplicate portions of a dataset relative to a baseline dataset, and for dynamically updating hashing algorithms used in such systems. Certain embodiments of the present invention provide a mechanism for distributed analysis of a large dataset that identifies a subset of the most common blocks of data, which can reduce user's storage volume locally and remotely. Certain embodiments also enable local computer systems using cloud-based storage to more quickly load programs, download data, save or load system state, or otherwise perform computer processing that relies on access to remotely stored data. Certain embodiments also improve the operation of cloud-connected computer systems by enabling data assembly and analysis that is limited by local memory throughput or local processing efficiency rather than being limited by network bandwidth or throughput. Reduced cloud storage volume can also improve the operation of related applications by reducing computer resource utilization—including network utilization and processor utilization—that would otherwise be consumed by processes related to loading or storing redundant data. The present invention also provides additional technical advantages over existing computer systems and techniques that are described in more detail below.

In one aspect, disclosed herein are computer-implemented methods for providing distributed analysis of a first dataset to automatically generate a baseline dataset of the most common blocks of the first dataset, the method comprising: distributing, by a master computer system over a computer network, the first dataset to a plurality of computer systems such that each of the plurality of computer systems is sent a first respective subset of the first dataset; calculating, by each of the plurality of computer systems, a respective first hash value for each of a plurality of blocks of the respective subset using a first hashing function; communicating, by each of the plurality of computer systems over the computer network, at least one first data structure to the master computer system, wherein the at least one first data structure indicates a respective count associated with each of the respective first hash values; receiving, by the master computer system over the computer network, the at least one respective first data structure from each of the plurality of computer systems; generating, by the master computer system based at least on the respective counts of the first hash values in the first data structures, a master data structure identifying the most common first hash values calculated by the plurality of computer systems; communicating, by the master computer system over the computer network, the master data structure to the plurality of computer systems; identifying, by each of the plurality of computer systems, one or more blocks of the first dataset having hash values present in the master data structure and, for each identified block, calculating a respective second hash value for the identified block using a second hashing function; communicating, by each of the plurality of computer systems over the computer network, at least one second data structure to the master computer system, wherein the at least one second data structure indicates a respective count for each of the calculated second hash values; receiving, by the master computer system over the computer network, the at least one respective second data structure from each of the plurality of computer systems; generating, by the master computer system, the baseline dataset based at least on the respective counts in the second data structures received from the plurality of computer systems, wherein the baseline dataset comprises the most common blocks of the first dataset. In some embodiments, the first hashing function is a weak hashing function, and the second hashing function is a strong hashing function. In some embodiments, the first dataset comprises a plurality of homogenous objects. In some embodiments, the first respective subsets are mutually exclusive subsets of the first dataset. In some embodiments, the method further comprises distributing, by the master computer system after generating the master data structure, the first dataset to the plurality of computer systems such that each of the plurality of computer systems receives a second respective subset of the first dataset, and wherein identifying one or more blocks of the first dataset having hash values present in the master data structure comprises: receiving, by each of the plurality of computer systems, a respective second subset of the first dataset; and identifying, by each of the plurality of computer systems, one or more blocks of the respective second subset having hash values present in the master data structure. In further embodiments, the respective first subset received by each of the plurality of computer systems is the same as the respective second subset previously received by that computer system. In some embodiments, calculating the respective first hash value for each of the plurality of blocks of the respective first subset comprises: parsing the respective first subset using a sliding window that defines each of the plurality of blocks of the respective first subset; and calculating the respective first hash value for each block defined by the sliding window. In further embodiments, the sliding window progresses byte-wise through at least a portion of each first respective subset. In some embodiments, identifying one or more blocks of the first dataset having hash values present in the master data structure comprises parsing a portion of the first dataset using a sliding window that defines each of the plurality of blocks of the first dataset. In further embodiments, the sliding window progresses byte-wise through at least a portion of each first respective subset. In some embodiments, each of the at least one first data structure comprises an array associating first hash values with their respective counts. In some embodiments, each of the at least one second data structure comprises an array associating second hash values with their respective counts and their respective blocks. In some embodiments, generating the master data structure identifying the most common first hash values comprises: totaling the respective counts of each first hash value identified in the first data structures; identifying a subset of the first hash values having the highest respective counts; and generating the master data structure such that it includes the identified subset of the first hash values. In some embodiments, generating the baseline dataset comprises: determining respective totals for the respective counts of the blocks referenced in the second data structures; identifying blocks of the first dataset having the highest respective totals; and generating the baseline dataset such that it includes the identified blocks of the first dataset. In some embodiments, generating the baseline dataset comprises storing the most common blocks of the first dataset in a database. In other embodiments, generating the baseline dataset comprises removing the least common blocks of the first dataset. In yet other embodiments, generating the baseline dataset comprises merging the most common blocks into at least one file. In some embodiments, the method further comprises: calculating, by a computer system, a respective third hash value for each of a plurality of blocks of the baseline dataset using a third hashing function; generating, by the computer system, a third data structure indexing each calculated third hash value; calculating, by the computer system, a respective fourth hash value for each of the plurality of blocks of the baseline dataset using a fourth hashing function; generating, by the computer system, a fourth data structure indexing each calculated fourth hash value; identifying, by the computer system, duplicate blocks of a target dataset that are also found in the baseline dataset by, for each of a plurality of blocks of the target dataset: calculating a first hash value for the block of the target dataset using the third hashing function; and if the first hash value for the block of the target dataset is present in the third data structure, calculating a second hash value for the block of the target dataset using the fourth hashing function and determining whether the second target hash value is present in the fourth data structure, wherein the presence of both the first and second hash values for the block of the target dataset in the third and fourth data structures, respectively, indicates that the associated block of the target dataset is a duplicate block; and generating, by the computer system, a differential output comprising: one or more references to blocks of the baseline dataset for blocks of the target identified as duplicate blocks; and one or more portions of the target dataset that are not identified as duplicate blocks.

In further embodiments, the method further comprises streaming the target dataset from a remote computer system over the computer network, wherein identifying the duplicate blocks comprises parsing the target dataset as the target dataset is streamed using a sliding window that defines each of the plurality of blocks of the target dataset. In still further embodiments, the sliding window progresses byte-wise through at least a portion of the target dataset as the target dataset is streamed. In some embodiments, the third hashing function is a weak hashing function, and the fourth hashing function is a strong hashing function.

In another aspect, disclosed herein are computer-implemented systems for providing distributed analysis of a first dataset to automatically generate a baseline dataset of the most common blocks of the first dataset, the system comprising: one or more computer processors configured to process executable instructions; one or more network interfaces configured to send and receive data over a computer network; and one or more computer memory devices storing executable instructions that, when executed by the one or more computer processes, cause the system to: distribute the first dataset to a plurality of computer systems over the computer network such that each of the plurality of computer systems is sent a first respective subset of the first dataset; receive at least one respective first data structure from each of the plurality of computer systems over the computer network, wherein each first data structure indicates a respective count associated with each of a plurality of first hash values associated with the first respective subset; generate a master data structure identifying the most common first hash values based at least on the respective counts of the first hash values in the first data structures; communicate the master data structure to the plurality of computer systems over the computer network; receive at least one second data structure from each of the plurality of computer systems over the computer network, wherein each second data structure indicates a respective count for one or more blocks of the first dataset; and generate the baseline dataset based at least on the respective counts in the second data structures received from the plurality of computer systems, wherein the baseline dataset comprises the most common blocks of the first dataset.

In yet another aspect, disclosed herein are computer-implemented methods for automatically deduplicating a target dataset relative to a baseline dataset, the method comprising: calculating a respective first hash value for each of a plurality of blocks of the baseline dataset using a first hashing function; generating a first data structure indexing each calculated first hash value; calculating a respective second hash value for each of the plurality of blocks of the baseline dataset using a second hashing function; generating a second data structure indexing each calculated second hash value; identifying, by the computer system, duplicate blocks of the target dataset that are also found in the baseline dataset by, for each of a plurality of blocks of the target dataset: calculating a first hash value for the block of the target dataset using the first hashing function; and if the first hash value for the block of the target dataset is present in the first data structure, calculating a second hash value for the block of the target dataset using the second hashing function and determining whether the second hash value for the block of the target dataset is present in the second data structure, wherein the presence of both the first and second hash values for the block of the target dataset in the first and second data structures, respectively, indicates that the block of the target dataset is a duplicate block; and generating, by the computer system, a differential output comprising: one or more references to blocks of the baseline dataset for blocks of the target identified as duplicate blocks; and one or more portions of the target dataset that are not identified as duplicate blocks.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION OF THE INVENTION

Described herein, in certain embodiments, are computer-implemented methods for providing distributed analysis of a first dataset to automatically generate a baseline dataset of the most common blocks of the first dataset, the method comprising: distributing, by a master computer system over a computer network, the first dataset to a plurality of computer systems such that each of the plurality of computer systems is sent a first respective subset of the first dataset; calculating, by each of the plurality of computer systems, a respective first hash value for each of a plurality of blocks of the respective subset using a first hashing function; communicating, by each of the plurality of computer systems over the computer network, at least one first data structure to the master computer system, wherein the at least one first data structure indicates a respective count associated with each of the respective first hash values; receiving, by the master computer system over the computer network, the at least one respective first data structure from each of the plurality of computer systems; generating, by the master computer system based at least on the respective counts of the first hash values in the first data structures, a master data structure identifying the most common first hash values calculated by the plurality of computer systems; communicating, by the master computer system over the computer network, the master data structure to the plurality of computer systems; identifying, by each of the plurality of computer systems, one or more blocks of the first dataset having hash values present in the master data structure and, for each identified block, calculating a respective second hash value for the identified block using a second hashing function; communicating, by each of the plurality of computer systems over the computer network, at least one second data structure to the master computer system, wherein the at least one second data structure indicates a respective count for each of the calculated second hash values; receiving, by the master computer system over the computer network, the at least one respective second data structure from each of the plurality of computer systems; generating, by the master computer system, the baseline dataset based at least on the respective counts in the second data structures received from the plurality of computer systems, wherein the baseline dataset comprises the most common blocks of the first dataset.

Also described herein, in certain embodiments, are computer-implemented systems for providing distributed analysis of a first dataset to automatically generate a baseline dataset of the most common blocks of the first dataset, the system comprising: one or more computer processors configured to process executable instructions; one or more network interfaces configured to send and receive data over a computer network; and one or more computer memory devices storing executable instructions that, when executed by the one or more computer processes, cause the system to: distribute the first dataset to a plurality of computer systems over the computer network such that each of the plurality of computer systems is sent a first respective subset of the first dataset; receive at least one respective first data structure from each of the plurality of computer systems over the computer network, wherein each first data structure indicates a respective count associated with each of a plurality of first hash values associated with the first respective subset; generate a master data structure identifying the most common first hash values based at least on the respective counts of the first hash values in the first data structures; communicate the master data structure to the plurality of computer systems over the computer network; receive at least one second data structure from each of the plurality of computer systems over the computer network, wherein each second data structure indicates a respective count for one or more blocks of the first dataset; and generate the baseline dataset based at least on the respective counts in the second data structures received from the plurality of computer systems, wherein the baseline dataset comprises the most common blocks of the first dataset.

Also described herein, in certain embodiments, are computer-implemented methods for automatically deduplicating a target dataset relative to a baseline dataset, the method comprising: calculating a respective first hash value for each of a plurality of blocks of the baseline dataset using a first hashing function; generating a first data structure indexing each calculated first hash value; calculating a respective second hash value for each of the plurality of blocks of the baseline dataset using a second hashing function; generating a second data structure indexing each calculated second hash value; identifying, by the computer system, duplicate blocks of the target dataset that are also found in the baseline dataset by, for each of a plurality of blocks of the target dataset: calculating a first hash value for the block of the target dataset using the first hashing function; and if the first hash value for the block of the target dataset is present in the first data structure, calculating a second hash value for the block of the target dataset using the second hashing function and determining whether the second hash value for the block of the target dataset is present in the second data structure, wherein the presence of both the first and second hash values for the block of the target dataset in the first and second data structures, respectively, indicates that the block of the target dataset is a duplicate block; and generating, by the computer system, a differential output comprising: one or more references to blocks of the baseline dataset for blocks of the target identified as duplicate blocks; and one or more portions of the target dataset that are not identified as duplicate blocks.

CERTAIN DEFINITIONS

Unless otherwise defined, all technical terms used herein have the same meaning as commonly understood by one of ordinary skill in the art to which this invention belongs.

As used herein, the term "object" refers to one or more values stored in a computer system. This term encompasses a file, data structure, or other discrete dataset that may or may not be associated with metadata specifying one or more characteristics of the object.

As used herein, the term "homogeneity" refers to the similarity within a single dataset or between two or more datasets. A "homogenous" data system refers to a system in which multiple instances of a dataset or objects in a dataset have a high degree of similarity relative to one another. Examples of homogenous data systems include systems in which analogous computer systems modify relatively small portions of the data within their own instances of a large dataset.

As used herein, the term "sliding window" refers to successive analysis of overlapping blocks of a dataset. A sliding window may progress through a dataset at a regular interval. For example, a sliding window may involve a byte-wise progression wherein adjacent overlapping blocks are offset by a single byte, though other offsets may be used. A sliding window may also progress through a dataset at varying intervals. For example, different offsets may be used in different portions of a dataset, or the offset may change dynamically based on various factors. In some instances, analysis of adjacent blocks may occur successively. For example, certain embodiments may involve a stream of data, successive blocks of which are analyzed as they are streamed in. Other embodiments may involve parallel processing of the blocks such that different blocks defined by the "sliding" window are analyzed in parallel. Block size may be constant or may vary dynamically.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

Deduplication

In some embodiments, the platforms, systems, media, and methods described herein incorporate deduplication of homologous data relative to a baseline dataset, or use of the same. Deduplication involves comparing two or more datasets (or comparing different portions of the same dataset) to remove, reference, or otherwise limit the representation of redundant portions of the datasets. Deduplication can be performed with different degrees of granularity. For example, deduplication may involve comparison of blocks of data with a block size of 16 bytes, 64 bytes, 256 bytes, 1 kilobyte, 10 kilobytes or any other block size. Deduplication can be performed on overlapping or non-overlapping blocks of data. Analysis of overlapping blocks can be performed using a sliding window.

Figure 1:
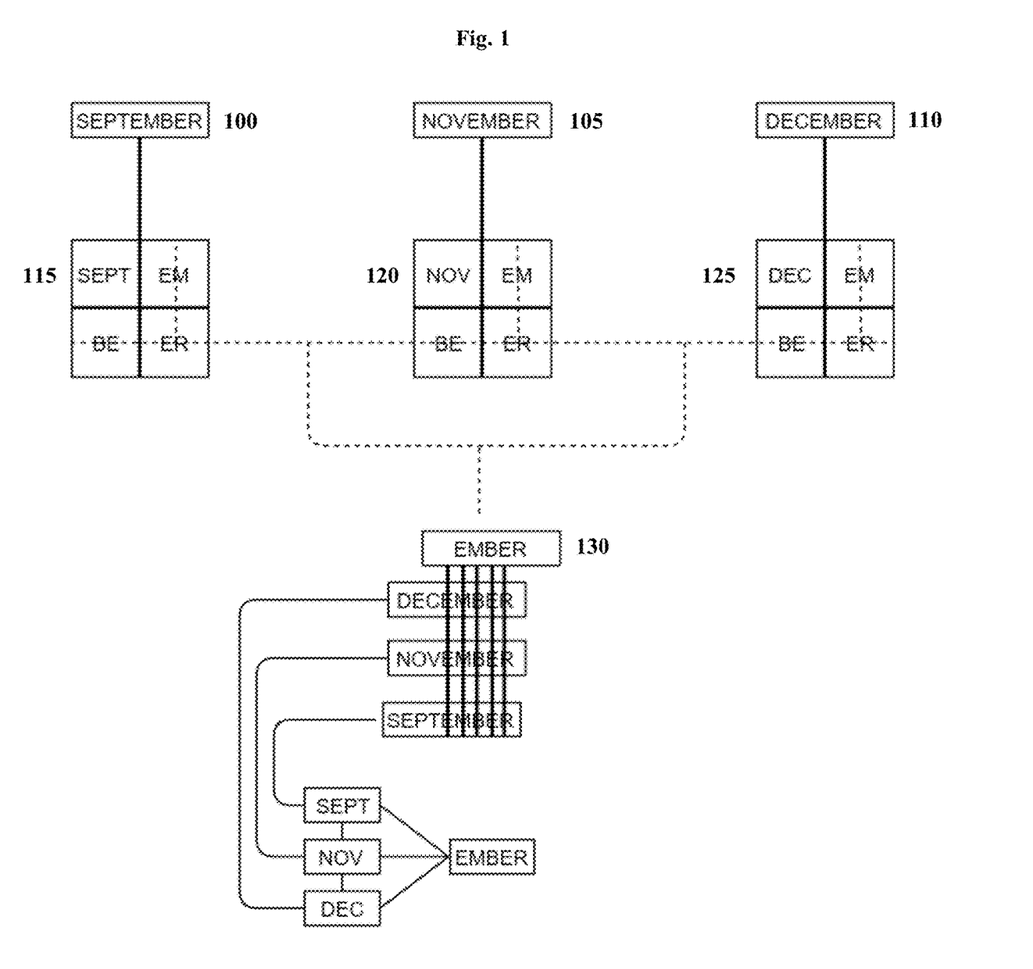
FIG. 1 shows a non-limiting example of deduplication; in this case, a differential representation of homogenous data.

FIG. 1 illustrates this deduplication concept with a simple example of using deduplication to generate a differential representation of homogenous data. In this example, "SEPTEMBER," "NOVEMBER," and "DECEMBER" represent objects or any type of arbitrarily large data. The order, type, or structure of this data depends on the type of system involved. Considering this rudimentary example, each of these "objects" is shown broken into four blocks, and three of the four blocks in each object are identical (i.e., the "EM" block, the "BE" block, and the "ER" block). As shown in FIG. 1, rather than storing the full object, a computer system can identify some of the duplicate blocks and store the object as a differential representation wherein the unique blocks are stored while the duplicate blocks are stored merely as references to a baseline dataset (in this example, "EMBER"). For example, a computer system with the "SEPTEMBER" object could instead store the object as a "SEPT" block and a reference to the duplicate "EMBER" blocks in baseline dataset.

In practice, unique blocks can be stored locally (e.g., in the local memory of the computer system) or remotely (e.g., in a cloud storage system or other remote data storage system). Similarly, the baseline dataset can be stored locally or remotely. The improved computer storage efficiency would be realized both in situations where different computer systems stores a respective object and shares a common baseline dataset maintained locally or in cloud-based storage; and in situations where a single computer system previously included all three objects and, following deduplication, no longer needs to store redundant copies of the duplicate blocks, regardless of whether such storage is local or remote. Reducing data redundancy provides additional technical advantages for distributed computer systems that use a shared or partially-shared dataset, particular when such systems leverage cloud-based storage or processing. For example, in such systems, storing or loading an object from the cloud would occur more quickly and with less monopolization of network, storage, and processing resources since redundant portions of the dataset would not need to be stored or communicated over the computer network.

As explained further in the sections below, one or more blocks identified as duplicates can be stored as a baseline dataset. In this example, "EMBER" represents the baseline dataset, though not all duplicate blocks are stored as part of the baseline in some embodiments. New objects, or future instances of the objects depicted here, can be diffed against the baseline rather than comparing such objects to the full dataset to identify redundancies. Use of a baseline dataset for deduplication may be particularly useful for datasets where the most common blocks of data are relatively stable over time (e.g., in data systems where a distributed network of computers use a common dataset and where each computer modifies a relatively small portion of its respective instance of the dataset). In other words, users can with reasonable confidence assume that a previously identified baseline of duplicate blocks (e.g., a subset of the most common blocks) still accurately reflects the duplicated content of the data system. In some embodiments, the baseline dataset is revised over time in an attempt to maintain a maximally efficient and accurate baseline.

Baseline Generation

In some embodiments, the platforms, systems, media, and methods described herein include a baseline generation system, or use of the same. As explained in the previous section, redundant portions of a dataset can be stored as a baseline dataset. Some embodiments of the present invention use a baseline generation system that automatically identifies the most common blocks of data in the system. Certain embodiments use a distributed system of computers to analyze the full dataset and identify the most common blocks of data. Such embodiments may use a "master" computer system, which refers to one or more computer systems that individually or collective manage the baseline generation process by coordinating the distributed analysis of the dataset. In such embodiments, the computer systems to which this analysis is distributed are referred to as "workers." Each worker encompasses one or more computer systems in communication with the master over a computer network, and any number of workers may be used. The master may also operate as a worker, or vice versa. One of more the master or worker computer systems may be operated as a virtual machine executing one or more physical devices.

Figure 2:
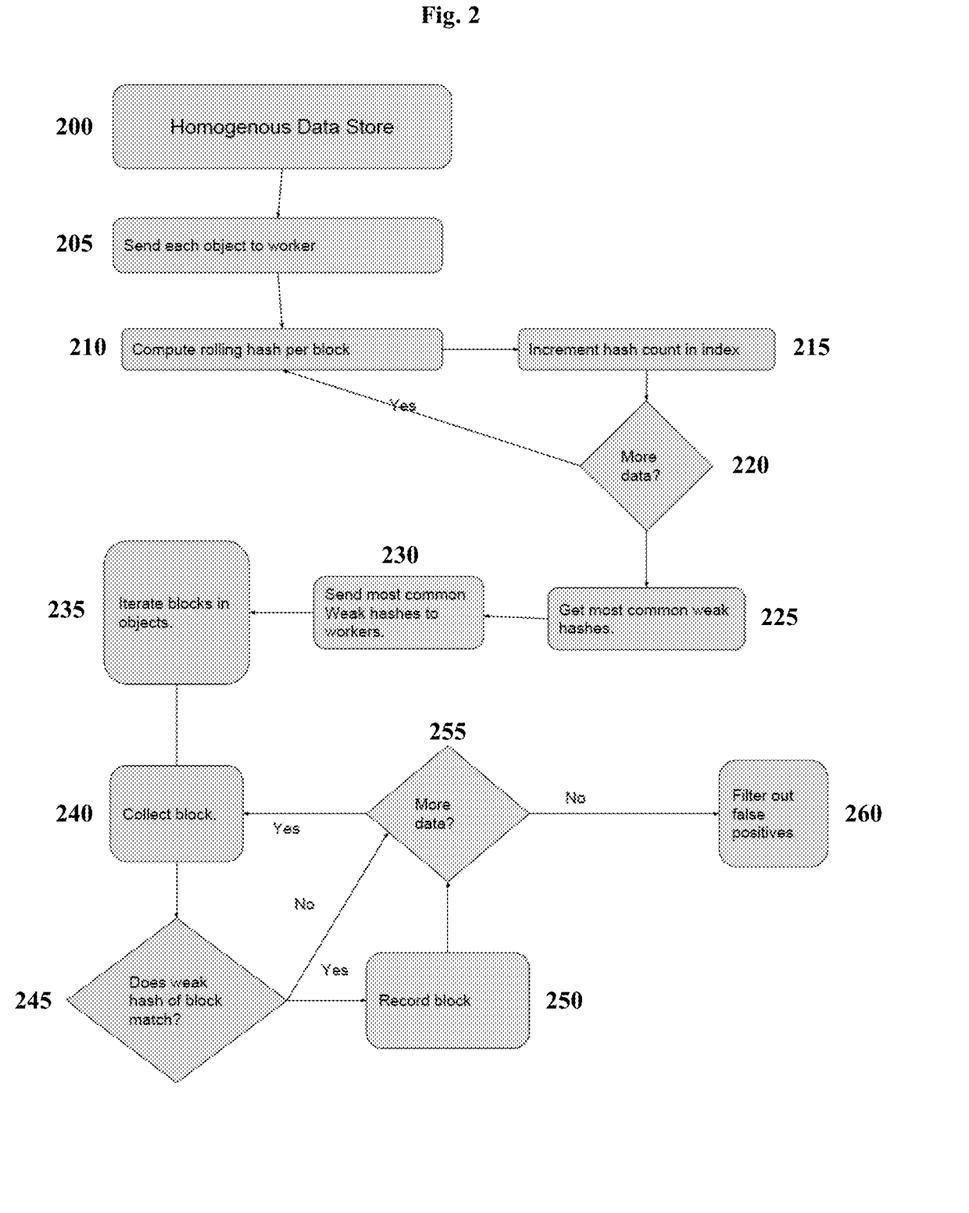
FIG. 2 shows a non-limiting example of generating a baseline dataset; in this case, a flow chart depicting an example process for distributed analysis of a dataset to identify the most common blocks of that dataset.

FIG. 2 shows a non-limiting example of generating a baseline dataset; in this case, a flow chart depicting an example process for distributed analysis of a dataset to identify the most common blocks of that dataset. In this example, as explained in more detail below, generation of the baseline dataset involves a multi-stage analysis of the full dataset using different hashing algorithms. A first-stage analysis by the workers identifies potentially popular blocks using a weak hashing algorithm that may identify false positives. Weak hash values are calculated for each block, and counts of the hash values calculated by each worker are collected to identify the most common hash values. In a second stage, the workers effectively filter out false positives (i.e., blocks the appeared to be duplicates during the first stage because of a hash collision) by recalculating hash values for the most popular blocks identified during the first stage using a strong hashing function. Embodiments using this process thus leverage distributed analysis of a large dataset to quickly identify good candidates for the baseline (i.e., blocks that appear to be common based on a faster weak hashing function) then confirm which blocks are actually the most common using a slower strong hashing function on the subset of candidates identified during the first stage. This baseline dataset is then stored for use in subsequent deduplication processing or for other purposes.

In step 200, a master computer system manages a dataset. Different embodiments may involve datasets of any homogeneity, though the efficiencies derived from the deduplication system may scale linearly with data similarity (as explained below, for example, in the discussion of FIG. 4). The dataset managed by the master computer system may be stored in any suitable type of computer memory using any suitable type of storage system including, but not limited to, one or more databases or file systems.

In step 205, the master distributes the dataset sends each object to one or more workers. In some embodiments, the master distributes the dataset by communicating the objects to the workers over a computer network. Such communication may be initiated by the master or the worker, and objects can be downloaded and stored by the workers or streamed without being maintained in long-term storage. In other embodiments, one or more objects in the dataset are already present on one or more worker computer systems, and the master may instruct such workers to analyze such objects rather than communicating the objects over the computer network or the worker may notify the master that it is analyzing such objects. In some embodiments, the master may distribute a set of object metadata to the workers prior to distribution of the objects themselves (or prior to worker-initiated analysis of objects already stored on their local computer systems). Such metadata can include an object ID or other information about the object. Objects may be distributed evenly or unevenly to the workers. For example, in some embodiments, the master orchestrates an approximately even distribution of the objects to each worker in the system. In other embodiments, workers download or otherwise initiate analysis of objects based on the workers' availability, such that workers with greater capacity ultimately handle more objects than workers with smaller capacity.

Steps 210, 215, and 220 depict an iterative process of calculating hash values for each block and maintaining a count indicating the frequency with which each hash value was encountered. In step 210, each work conducts a first-stage analysis of one or more objects. In the illustrated embodiment, each worker computes a rolling hash analysis of each assigned object. For example, a worker may use a sliding window algorithm that parses the object such that each iteration of the window defines a new block. For example, a 1 KB sliding window would define 1 KB blocks, which may be overlapping or non-overlapping. In some embodiments, the sliding window progresses byte-wise through each object, while other embodiments step through each object at smaller or larger intervals. In particular embodiments, each worker parses a streamed object as it is received. Regardless of the way in which blocks are identified and selected for processing, a worker calculates a hash value and, as shown in step 215, increments a count for the calculated hash value. In the illustrated embodiment, a weak hashing function is used in the first stage, though other mechanisms for identifying candidate blocks may be used in other embodiments.

As noted above, step 215 involves incrementing a respective for each calculated hash value. These counts may be stored locally in a data structure and later communicated to the master, or workers may notify the master of the hash values and their corresponding counts at various intervals. For example, in some embodiments the worker updates a data structure (e.g., an array indexing the calculated hash values) to maintain a running count for each calculated hash value, then communicates that data structure to the master after all objects are processed, after each object is processed, or at other intervals. This data structure may also include a reference to the particular block or blocks associated with the calculated hash value to enable fast location of the candidate block during later stages. For example, each hash value may also be associated with a set of references (for example, one or more block IDs) to the blocks that corresponded to that hash value. In other embodiments, rather than maintaining its own index of the hash value counts and later sending that data structure to the master, the worker notifies the master as each hash value is calculated so that the master maintains a running count of the hash value frequencies.

In step 220, the process moves to the next block after calculating the hash value for the previous block and incrementing the counter. In some embodiments, the worker moves through this cycle one block at a time until all allocated blocks have been analyzed. Other embodiments utilize parallel processing so that workers can analyze multiple blocks at the same time. Once all blocks have been analyzed, the process advances to step 225.

In step 225, the master identifies the most common hashes. In some embodiments, having collected respective counts for the hash values calculated by the workers, the master adds the counts received from the various workers to produce a master data structure (or "master index") indicating total counts for the calculated hash values. In other embodiments, the master maintains its own hash index during steps 210-220 as workers signal the master on the fly when one or more hash values are calculated. Based on the respective hash counts, the master may limit the master index to only the most common hash values. For example, the master may remove hash values from the master index if they have counts that are below a threshold value. As another example, the master may limit the master index to a fixed number of the most common hash values (e.g., the 100 most common hash values or the 1000 most common values). Other embodiments may limit the size of the master index by any suitable mechanism. Once this step is complete, the master has generated a data structure that identifies the most common hash values from the first stage.

In step 230, the master initiates the second stage of the analysis. In some embodiments, the master distributes the master data structure to the workers. In other embodiments—for example, where the master index includes references to the corresponding blocks for each hash value and—the master simply distributes the blocks or, if the workers maintained the candidate blocks in their local memory after identifying them, distributes object references to the workers. In such embodiments, the cycle shown in steps 240-255 can be abbreviated since the worker will already have confirmation that each block is a candidate block with having to calculate the weak hash value again (though such embodiments involve additional storage overhead on other steps). The distribution of objects or object metadata can occur via any of the mechanisms described above with respect to step 205.

In step 235, the workers begin a second-stage analysis of the candidate blocks. For example, a worker may download or otherwise access an allocated object and iterate through each block within that object to identify candidate blocks. A candidate block is identified by having a weak hash value that matches a hash value in the index received from the master. Other embodiments may use different techniques for identifying candidate blocks during the second stage.

In steps 240, 245, 250, and 255, the worker iterates through each block to identify candidate blocks by determining whether the block's hash value, calculated using the same hashing function that was used during step 210, matches a hash value in the master index of the most common hash values. This iteration through the blocks can use any of the sliding window techniques discussed above in the context of the steps 210, 215, and 220. In step 240, the block is collected (e.g., the sliding window can proceed to the next point in the object, thereby defining a new block). In step 245, the worker calculates the hash value for that block using the same hashing function and determines whether the calculated value matches a hash value in the master index. If so, the process moves to step 250, where the worker maintains any suitable record of the candidate block. For example, the worker may update a data structure identifying the candidate block. If not, then the current block is not a candidate for being one of the most common blocks, and, as shown in step 255, the worker determines whether there are additional blocks to analyze. This cycle continues until all blocks have been analyzed.

In step 260, the false positives in the set of candidate blocks are filtered out. For example, the worker may calculate a second hash value using a different hashing function. In various embodiments, the worker may use a strong hashing function, a weak hash function that is different from the hashing function used in step 210, or any other suitable function that would either confirm that the block is a false positive or increase the likelihood that the block is in fact a duplicate block. The worker then updates a data structure indexing strong hash values (or whatever values are calculated for each block during this step) such that the respective count associated with each strong hash value and its corresponding block is maintained. For example, the worker may maintain an array associating each strong hash value with its respective count and a reference to the corresponding block. The worker communicates this data structure counts (and their associated block. The communication of counts to the master computer system may use any of the techniques discussed above in the context of step 225 (e.g., maintaining an index of the hash values, blocks, and their counts and then sending the index to the master; or signaling the master each time a strong hash is calculated so that the master can maintain the counts).

Once the master receives the information indicating counts for each strong hash (or its associated block), the master generates the baseline dataset. As noted above, this baseline dataset includes the most common blocks from the full dataset. In identifying a subset of the most common blocks, the master may use any of the techniques discussed above in the context of step 225. For example, the master may limit the baseline dataset to blocks with counts that are above a threshold value. The same result can also be accomplished by removing blocks from the full dataset if they are associated with a count that is below a threshold value. As another example, the master may limit the baseline dataset to a fixed number of blocks, including those with the highest associated counts, or otherwise limit the baseline to a particular size. Other embodiments may limit the size of the baseline by any suitable mechanism.

The baseline dataset can be stored in any suitable manner. For example, the blocks may be stored in a database or file system, which may be globally accessible to workers or to other sets of computers that will subsequently utilize the baseline. The baseline dataset may be stored as a collection of separate blocks, or one or more blocks may be merged (e.g., the entire baseline may be merged into a single file). In some embodiments, the system stores a hash value corresponding to each block of the baseline in lieu of, or in addition to, storing the blocks themselves. For example, one or more indexes of hash values may be stored. In a particular example, a weak hash index (identifying hash values calculated for each baseline block using a weak hashing function) and a strong hash index (identifying hash values calculated for each baseline block using a strong hashing function) are generated. The baseline or a portion thereof may be stored locally by one or more separate computer systems. Such computer systems would then be able to deduplicate relative to the baseline, or perform other data processing using the baseline, without having to obtain the entire baseline from the remote storage system.

Hash Function Optimization

In some embodiments, the platforms, systems, media, and methods described herein include a system or process for optimizing a hash function used in the generation of the baseline dataset (an example of which is illustrated in FIG. 2) or in a subsequent deduplication step.

Figure 3:
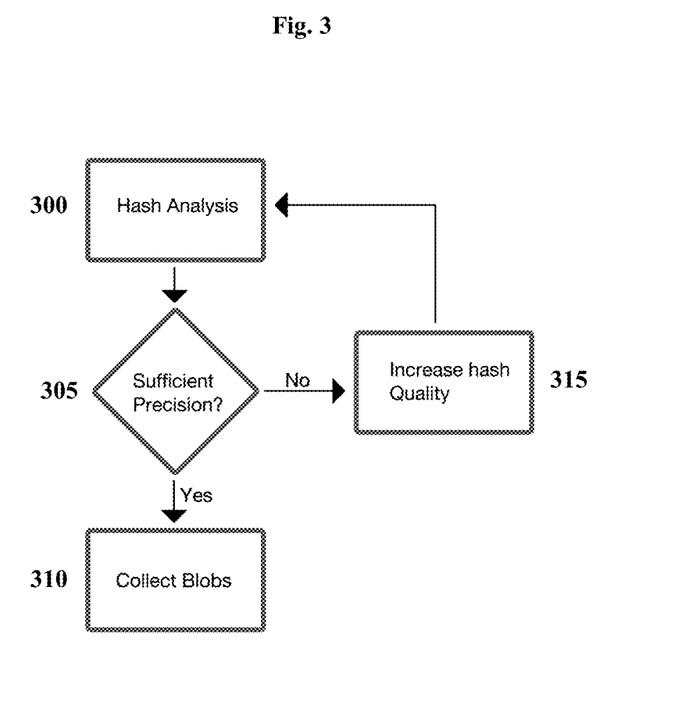
FIG. 3 shows a non-limiting example of dynamically updating or selecting a hashing function; in this case, a flow chart depicting an example process for iteratively analyzing the suitability of a hashing function.

FIG. 3 shows a non-limiting example of dynamically updating or selecting a hashing function. In particular, FIG. 3 depicts a flow chart of an example process for iteratively analyzing the suitability of a hashing function. Certain embodiments use these techniques to improve the efficiency or accuracy of the hashing function in the context of generating the baseline dataset, deduplicating relative to the baseline dataset, or in other contexts.

In step 300, hash analysis (e.g., the hash analysis described above in the context of first or second stage of FIG. 2) is conducted with a weak hashing function. For example, the system may iterate through a set of blocks in one or more objects and identify the most common hash values calculated using that hashing function.

In step 305, the system determines whether the precision of this analysis is suitable. Suitability may be determined by the number of false positives generated (or that are likely generated), by the hashing function's ability or inability to find a sufficient number of candidate blocks. For example, a number of false positives can be determined, and suitability can be determined by comparing that number to a threshold value or a range of values. As another example, the number of candidate blocks identified can be compared to a threshold value or a range of values. Suitability may also be based on the speed of the hashing function. In some embodiments, false positives are identified by running the second stage analysis described above in the context of FIG. 2 using a different hashing function (e.g., a strong hashing function). In other embodiments, the hash analysis of step 300 is performed on a test dataset for which duplicate blocks are known ahead of time, and the results of that hash analysis can be compared to the correct results to determine the number of false positives, the extent to which the analysis identified the correct number of candidate blocks, whether the analysis failed to identify actual duplicate blocks, or other factors that indicate the accuracy or speed of the hashing function. If the system determines that the hashing function is suitable, the system may proceed to step 310 in which the system generates the baseline based on the second-stage hashing analysis described above in the context of FIG. 2. If the system determines that the hashing function is not suitable, it proceeds to step 315.

In step 315, the system seeks to improve the hash quality by modifying the hashing function, modifying the way that the hashing function is applied, or selecting a different hashing function. In some embodiments, the system modifying the hashing function by adding more bits to the function's output, though other hash modifications can be used. Once the change is made, the process returns to step 300 and another has analysis is performed. This loop may continue until a suitable hashing function is identified.

The process of FIG. 3 can be performed prior to actual use of the present invention in enterprises systems in order to refine the selected hashing functions ahead of time. In other embodiments, this analysis is performed in conjunction with actual baseline generation or deduplication to dynamically refine the hashing analysis on the fly.

Two-Stage Deduplication

In some embodiments, the platforms, systems, media, and methods described herein include a two-stage deduplication system, or use of the same. This deduplication process may involve at least two steps, including a baseline indexing phase (in which at least two indexes are created for hash values calculated based on the blocks of the baseline dataset) and a deduplication phase (in which a differential representation of a target dataset relative to the baseline is generated).

In the baseline indexing phase, the system generates at least two data structures identifying hash values associated with the baseline dataset. In some embodiments, this baseline dataset is the same baseline dataset generated using the process described in FIG. 2. In other embodiments, the baseline index itself is obtained directly from the process described in FIG. 2 (i.e., the example described above in which baseline indexes are stored in lieu of or in addition to the actual blocks of the baseline). In some embodiments, the system generates or accesses a weak hash index and a strong hash index. The weak hash index includes hash values for each block of the baseline calculated based on a weak hashing function. The strong hash index is analogous to the weak hash index but with hash values calculated based on a strong hashing function. In an example embodiment, the block size is 1 KB, the weak hashing function is RabinKarp32, and the strong hash is Blake2b. In other example embodiments, the weak hash index is a probabilistic bitset, and the strong hash index is a Go hashmap.

In certain embodiments, if the baseline dataset is seekable (e.g., on a filesystem), the memory consumption of the base indexing phase can be described as:

$$((strongHashSize+weakHashSize+indexSizeOverheadPerEntry)/blockSize)*numberOfBlocks$$

In one experimental use case, an implementation of the two-stage deduplication system resulted in an output to this function of approximately 40 bytes of overhead per block (or an approximate memory reduction of 96%). Moreover, as baseline datasets increase in size, their ability to serve as an index increases linearly.

During the deduplication phase, a target dataset is diffed relative to the baseline dataset using the at least two indexes (e.g., the weak hash index and the strong hash index). One or more blocks of a target dataset are obtained (e.g., by streaming an object from a remote storage center), and for each block, a hash value is calculated using the same hashing function that was used to create the first hash index (e.g., the weak hashing function used to create the weak hash index). Sliding window embodiments of the deduplication phase enable the system to operate on pure data streams with limited or no buffering. In such embodiments, the ability to operate on a stream allows the system to deduplicate a file immediately as it received. Such implementations may improve the performance of the computer system since the operation is not constrained by internal network performance or internal storage operations. The system then determines whether this hash value is present in the first hash index, which would indicate that the current block is a duplicate candidate. If the hash value is not a member of the first hash index, the system moves onto the next block. If membership in the first hash index is confirmed, the system calculates a second hash value using the second hashing function (i.e., the same hashing function used to create the second hash index), such as a strong hashing function. If membership in both hash indexes is confirmed, the block is determined to be a duplicate of the baseline dataset.

In some embodiments, the deduplication phase uses a sliding window on the target dataset. For example, the system may progress byte-wise through the target dataset. In such embodiments, for a given block size BS, if the system has traversed BS blocks without identifying a match in either index, then the last BS bytes are confirmed as non-redundant relative to the baseline.

In some embodiments, the system generates a differential output to create a differential representation of the target data. For example, as the blocks are analyzed, the system may output a portion of the target data itself whenever it confirms the non-redundancy of that portion. In some embodiments, portions of the target dataset are identified as non-redundant when the system has traverses a contiguous portion of the target dataset that is at least as big as the block size without finding a duplicate block. When the system identifies a duplicate block from the baseline dataset, it may output a reference to that block in the baseline. The window may then continue sliding forward or jump forward by one block. The differential representation of the target data may include "original" portions of the target dataset (e.g., literal references) and references to existing blocks in the baseline, though other differential representations may also be used. In some embodiments, data is identified as duplicate or original only in block-sized chunks, while in other embodiments, duplicate data is identified in blocks while original data can be identified in portions that are different from the block size. Using differential representations as described above can improve data storage efficiency by quickly and accurately identifying duplicate portions of the data relative to a baseline and eliminating the need to store the full target dataset.

Additional refinement of the differential representation can be performed to further improve data storage efficiency. For example, the system can combine contiguous "original" portions of the target data, removing storage overhead associated with multiple distinct portions of the data. As another example, multiple baseline block references that are adjacent in both the target and baseline datasets can be replaced with a range of block references. As another example, multiple repeated baseline references can be replaced by a shorter indicator of repeat references. As yet another example, in additional to identifying redundant portions of the target data relative to the baseline dataset, the system can also identifying portions of the target dataset that are internally redundant and replace one or more of those instances with a reference.

Storage Efficiencies

Figure 4A:
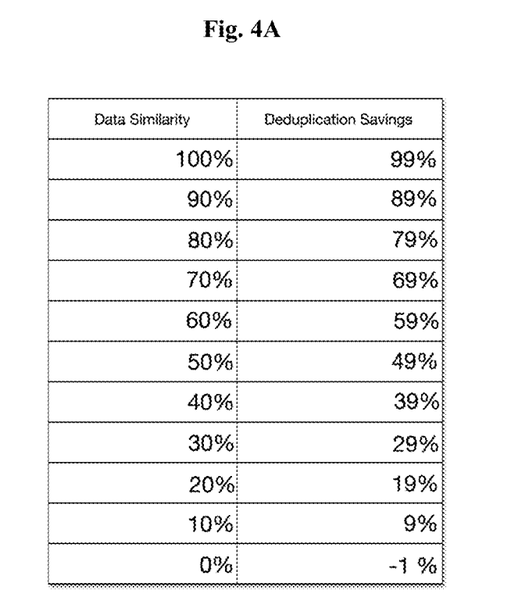
FIGS. 4A and 4B show non-limiting examples of technical advantages provided by certain embodiments of the present invention; in this case, reduction in data storage requirements provided by deduplication of datasets with different amounts of homogeneity.
Figure 4B:
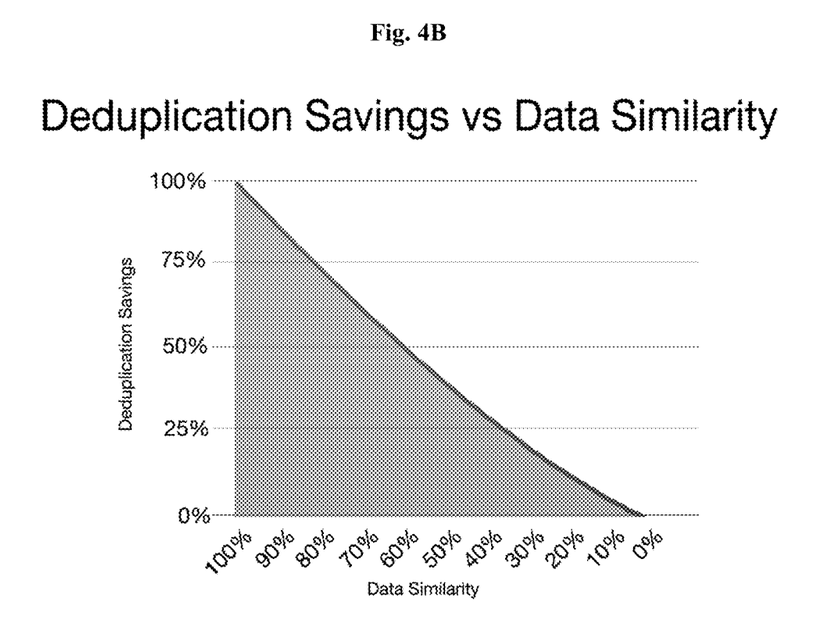

Certain embodiments of the present invention described herein provide significant storage efficiencies due to the reduced storage demands following deduplication relative to the baseline dataset. FIGS. 4A and 4B illustrate the impact of these technical improvements in chart and graph form, respectively.

FIG. 4A depicts a spreadsheet listing deduplication savings as a function of data similarity within the dataset that are achieved in some embodiments of the present invention. This chart assumes a storage overhead of 1% due to factors such as the format of the differential representation of the deduplicated objects, though other embodiments may involve different amounts of storage overhead. Accordingly, even a dataset with 100% data similarity would achieve only a 99% improvement in storage efficiency. As shown in FIG. 4A, a dataset with 90% data similarity achieves a deduplication savings of approximately 89%, a dataset with 80% data similarity achieves a deduplication savings of approximately 79%, and so on. Other embodiments exhibit different relationships between data similarity and deduplication savings. For example, the overhead may be affected by the block size, the choice of hashing functions, and various other factors. Data similarity of a given dataset may be dependent upon block size, since small differences in the data relative to the block size may decrease data similarity to a greater extent in systems using a larger block size (i.e., as the granularity of the deduplication analysis decreases).

FIG. 4B depicts a graph of the storage efficiencies shown in FIG. 4A. This graph illustrates the linear relationship between data similarity and deduplication savings in certain embodiments.

Digital Processing Device

In some embodiments, the platforms, systems, media, and methods described herein include a digital processing device (also referred to as a computing system, a computer system, and/or a computer), or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, tablet computers, and the like. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 5:
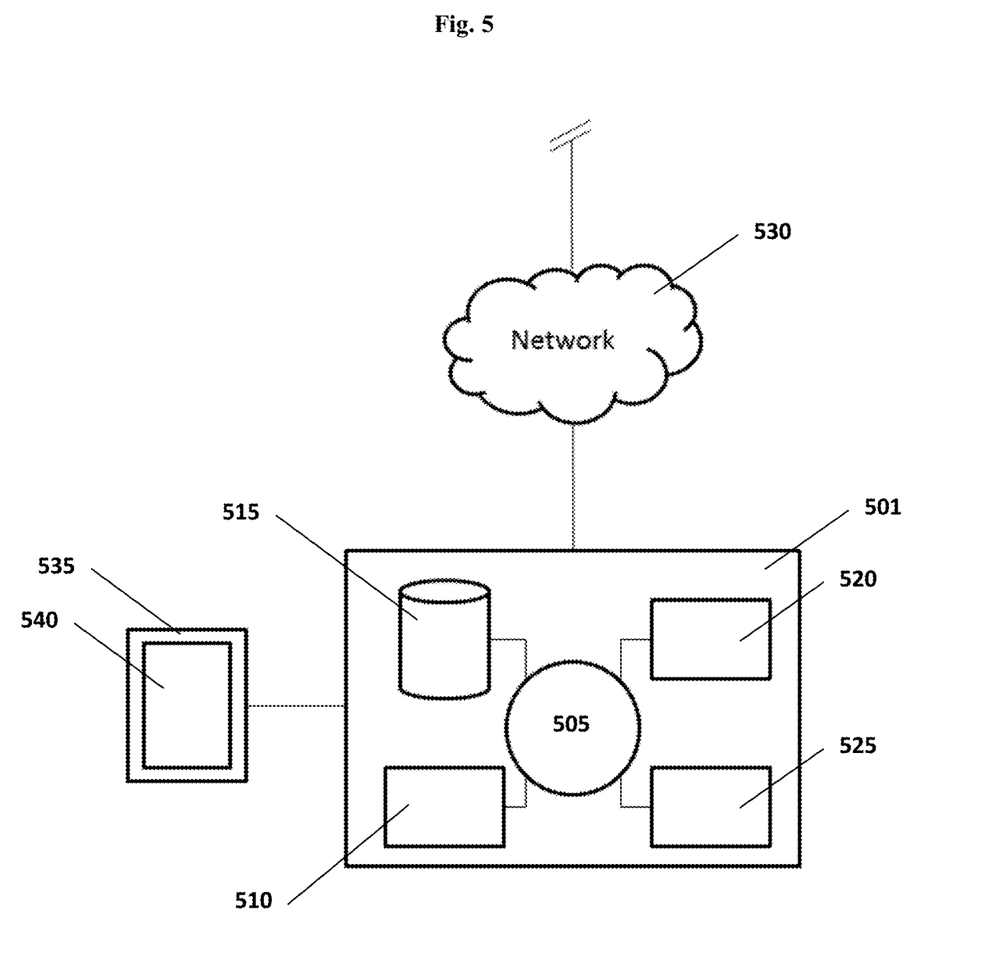
FIG. 5 shows a non-limiting example of a digital processing device; in this case, a device with one or more CPUs, a memory, a communication interface, and an optional display.

Referring to FIG. 5, in a particular embodiment, a computer 501 is programmed or otherwise configured to, for example, generate, distribute, and/or identify blocks in datasets, receive, generate, and/or communicate data structures, calculate first hash values, and the like. In this embodiment, the computer 501 includes a central processing unit (CPU, also "processor" and "computer processor" herein) 505, which is optionally a single core, a multi core processor, or a plurality of processors for parallel processing. The computer 501 also includes memory or memory location 510 (e.g., random-access memory, read-only memory, flash memory), electronic storage unit 515 (e.g., hard disk drive and/or solid state drive), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 comprises a data storage unit (or data repository) for storing data. The computer 501 is optionally operatively coupled to a computer network ("network") 530 with the aid of the communication interface 520. The network 530, in various cases, is the internet, an internet, and/or extranet, or an intranet and/or extranet that is in communication with the internet. The network 530, in some cases, is a telecommunication and/or data network. The network 530 optionally includes one or more computer servers, which enable distributed computing, such as cloud computing. The network 530, in some cases, with the aid of the device 501, implements a peer-to-peer network, which enables devices coupled to the device 501 to behave as a client or a server.

Continuing to refer to FIG. 5, the CPU 505 is configured to execute a sequence of machine-readable instructions, embodied in a program, application, and/or software. The instructions are optionally stored in a memory location, such as the memory 510 or electronic storage unit 515. The instructions are directed to the CPU 505, which subsequently program or otherwise configure the CPU 505 to implement methods of the present disclosure. Examples of operations performed by the CPU 505 include fetch, decode, execute, and write back. The CPU 505 is, in some cases, part of a circuit, such as an integrated circuit. One or more other components of the device 501 are optionally included in the circuit. In some cases, the circuit is an application specific integrated circuit (ASIC) or a field programmable gate array (FPGA).

Continuing to refer to FIG. 5, the storage unit 515 optionally stores files, such as drivers, libraries and saved programs. The storage unit 515 optionally stores user data, e.g., user preferences and user programs. The computer 501, in some cases, includes one or more additional data storage units that are external, such as located on a remote server that is in communication through an intranet or the internet.

Continuing to refer to FIG. 5, the computer 501 optionally communicates with one or more remote computer systems through the network 530. For instance, the device 501 optionally communicates with a remote computer system of a user. Examples of remote computer systems include clouds, servers, personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or the like.

Methods as described herein are optionally implemented by way of machine (e.g., computer processor) executable code stored on an electronic storage location of the computer 501, such as, for example, on the memory 510 or electronic storage unit 515. The machine executable or machine readable code is optionally provided in the form of software. During use, the code is executed by the processor 505. In some cases, the code is retrieved from the storage unit 515 and stored on the memory 510 for ready access by the processor 505. In some situations, the electronic storage unit 515 is precluded, and machine-executable instructions are stored on the memory 510.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of baseline datasets, files, file systems, objects, systems of objects, as well as data structures and other types of information described herein. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

What is claimed is:

1. A computer-implemented method for providing distributed analysis of a first dataset to automatically generate a baseline dataset of the most common blocks of the first dataset, the method comprising:
   distributing, by a master computer system over a computer network, the first dataset to a plurality of computer systems such that each of the plurality of computer systems is sent a first respective subset of the first dataset;
   calculating, by each of the plurality of computer systems, a respective first hash value for each of a plurality of blocks of the respective subset using a first hashing function;
   communicating, by each of the plurality of computer systems over the computer network, at least one first data structure to the master computer system, wherein the at least one first data structure indicates a respective count associated with each of the respective first hash values;
   receiving, by the master computer system over the computer network, the at least one respective first data structure from each of the plurality of computer systems;
   generating, by the master computer system based at least on the respective counts of the first hash values in the first data structures, a master data structure identifying the most common first hash values calculated by the plurality of computer systems;
   communicating, by the master computer system over the computer network, the master data structure to the plurality of computer systems;
   identifying, by each of the plurality of computer systems, one or more blocks of the first dataset having hash values present in the master data structure and, for each identified block, calculating a respective second hash value for the identified block using a second hashing function;
   communicating, by each of the plurality of computer systems over the computer network, at least one second data structure to the master computer system, wherein the at least one second data structure indicates a respective count for each of the calculated second hash values;
   receiving, by the master computer system over the computer network, the at least one respective second data structure from each of the plurality of computer systems; and
   generating, by the master computer system, the baseline dataset based at least on the respective counts in the second data structures received from the plurality of computer systems, wherein the baseline dataset comprises the most common blocks of the first dataset.

2. The computer-implemented method of claim 1, wherein the first hashing function is a weak hashing function, and the second hashing function is a strong hashing function.

3. The computer-implemented method of claim 1, wherein the first dataset comprises a plurality of homogenous objects.

4. The computer-implemented method of claim 1, wherein the first respective subsets are mutually exclusive subsets of the first dataset.

5. The computer-implemented method of claim 1, further comprising distributing, by the master computer system after generating the master data structure, the first dataset to the plurality of computer systems such that each of the plurality of computer systems receives a second respective subset of the first dataset, and wherein identifying one or more blocks of the first dataset having hash values present in the master data structure comprises:
   receiving, by each of the plurality of computer systems, a respective second subset of the first dataset; and
   identifying, by each of the plurality of computer systems, one or more blocks of the respective second subset having hash values present in the master data structure.

6. The computer-implemented method of claim 5, wherein the respective first subset received by each of the plurality of computer systems is the same as the respective second subset previously received by that computer system.

7. The computer-implemented method of claim 1, wherein calculating the respective first hash value for each of the plurality of blocks of the respective first sub set comprises:
   parsing the respective first subset using a sliding window that defines each of the plurality of blocks of the respective first subset; and
   calculating the respective first hash value for each block defined by the sliding window.

8. The computer-implemented method of claim 7, wherein the sliding window progresses byte-wise through at least a portion of each first respective subset.

9. The computer-implemented method of claim 1, wherein identifying one or more blocks of the first dataset having hash values present in the master data structure comprises parsing a portion of the first dataset using a sliding window that defines each of the plurality of blocks of the first dataset.

10. The computer-implemented method of claim 1, wherein each of the at least one first data structure comprises an array associating first hash values with their respective counts.

11. The computer-implemented method of claim 1, wherein each of the at least one second data structure comprises an array associating second hash values with their respective counts and their respective blocks.

12. The computer-implemented method of claim 1, wherein generating the master data structure identifying the most common first hash values comprises:
   totaling the respective counts of each first hash value identified in the first data structures;
   identifying a subset of the first hash values having the highest respective counts; and
   generating the master data structure such that it includes the identified subset of the first hash values.

13. The computer-implemented method of claim 1, wherein generating the baseline dataset comprises:
   determining respective totals for the respective counts of the blocks referenced in the second data structures;
   identifying blocks of the first dataset having the highest respective totals; and
   generating the baseline dataset such that it includes the identified blocks of the first dataset.

14. The computer-implemented method of claim 1, wherein generating the baseline dataset comprises storing the most common blocks of the first dataset in a database.

15. The computer-implemented method of claim 1, wherein generating the baseline dataset comprises removing the least common blocks of the first dataset.

16. The computer-implemented method of claim 1, wherein generating the baseline dataset comprises merging the most common blocks into at least one file.

17. The computer-implemented method of claim 1, further comprising:
   calculating, by a computer system, a respective third hash value for each of a plurality of blocks of the baseline dataset using a third hashing function;
   generating, by the computer system, a third data structure indexing each calculated third hash value;
   calculating, by the computer system, a respective fourth hash value for each of the plurality of blocks of the baseline dataset using a fourth hashing function;
   generating, by the computer system, a fourth data structure indexing each calculated fourth hash value;
   identifying, by the computer system, duplicate blocks of a target dataset that are also found in the baseline dataset by, for each of a plurality of blocks of the target dataset:
   calculating a first hash value for the block of the target dataset using the third hashing function; and
   if the first hash value for the block of the target dataset is present in the third data structure, calculating a second hash value for the block of the target dataset using the fourth hashing function and determining whether the second target hash value is present in the fourth data structure, wherein the presence of both the first and second hash values for the block of the target dataset in the third and fourth data structures, respectively, indicates that the associated block of the target dataset is a duplicate block; and
   generating, by the computer system, a differential output comprising: one or more references to blocks of the baseline dataset for blocks of the target identified as duplicate blocks; and
   one or more portions of the target dataset that are not identified as duplicate blocks.

18. The computer-implemented method of claim 17, further comprising streaming the target dataset from a remote computer system over the computer network, wherein identifying the duplicate blocks comprises parsing the target dataset as the target dataset is streamed using a sliding window that defines each of the plurality of blocks of the target dataset.

19. The computer-implemented method of claim 18, wherein the sliding window progresses byte-wise through at least a portion of the target dataset as the target dataset is streamed.

20. The computer-implemented method of claim 17, wherein the third hashing function is a weak hashing function, and the fourth hashing function is a strong hashing function.

* * * * *